United States Patent [19]
Larkin

[11] 4,118,606
[45] * Oct. 3, 1978

[54] ACOUSTICAL VOICE TRANSMITTING HEADSET

[76] Inventor: Wallace Keith Larkin, 360 Hidden Valley Rd., Soquel, Calif. 95073

[*] Notice: The portion of the term of this patent subsequent to Nov. 23, 1993, has been disclaimed.

[21] Appl. No.: 743,307

[22] Filed: Nov. 19, 1976

Related U.S. Application Data

[63] Continuation-in-part of Ser. No. 561,473, Mar. 24, 1975, Pat. No. 3,933,879, and Ser. No. 667,981, Mar. 18, 1976.

[51] Int. Cl.$^2$ .................. H04M 1/05; G10K 11/12
[52] U.S. Cl. ................................ 179/156 A; 181/20; 179/187
[58] Field of Search ............. 179/156 A, 187; 181/18, 181/20

[56] References Cited

U.S. PATENT DOCUMENTS

| 3,781,492 | 12/1973 | Cragg et al. | 179/156 A |
|---|---|---|---|
| 3,993,879 | 11/1976 | Larkin | 179/156 A |

Primary Examiner—William C. Cooper
Attorney, Agent, or Firm—Limbach, Limbach & Sutton

[57] ABSTRACT

A detachable, voice transmit-only headset is all-acoustic and comprises means for mounting the headset on the head of the user and a flexible transmitter tube supported by the mounting means. One end of the tube is adapted for adjustably positioning near the mouth of the user for conducting sound therefrom and the other end terminates in a coupling adapted to releasably connect to electronic communications equipment remote from the user's head.

12 Claims, 2 Drawing Figures

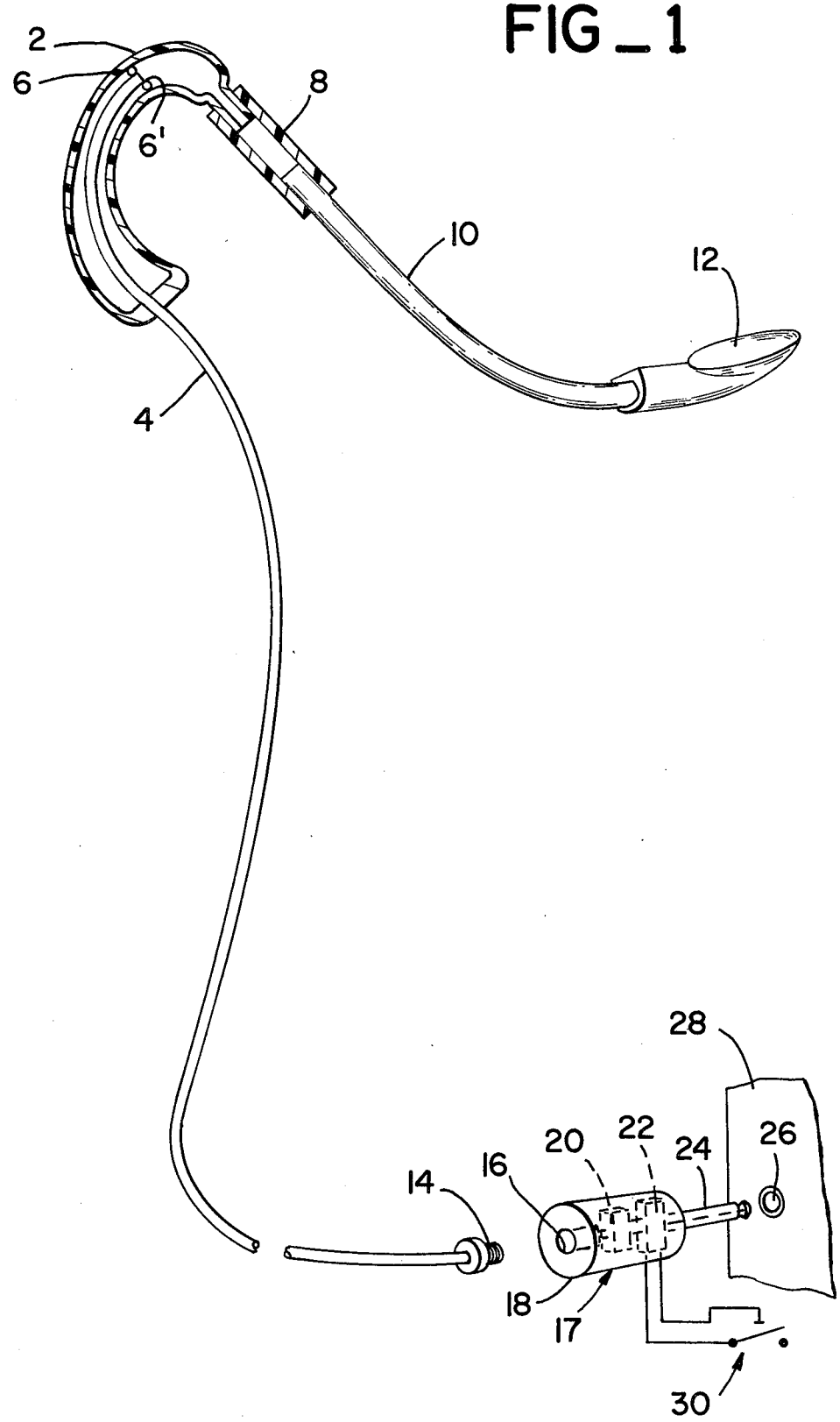
FIG_1

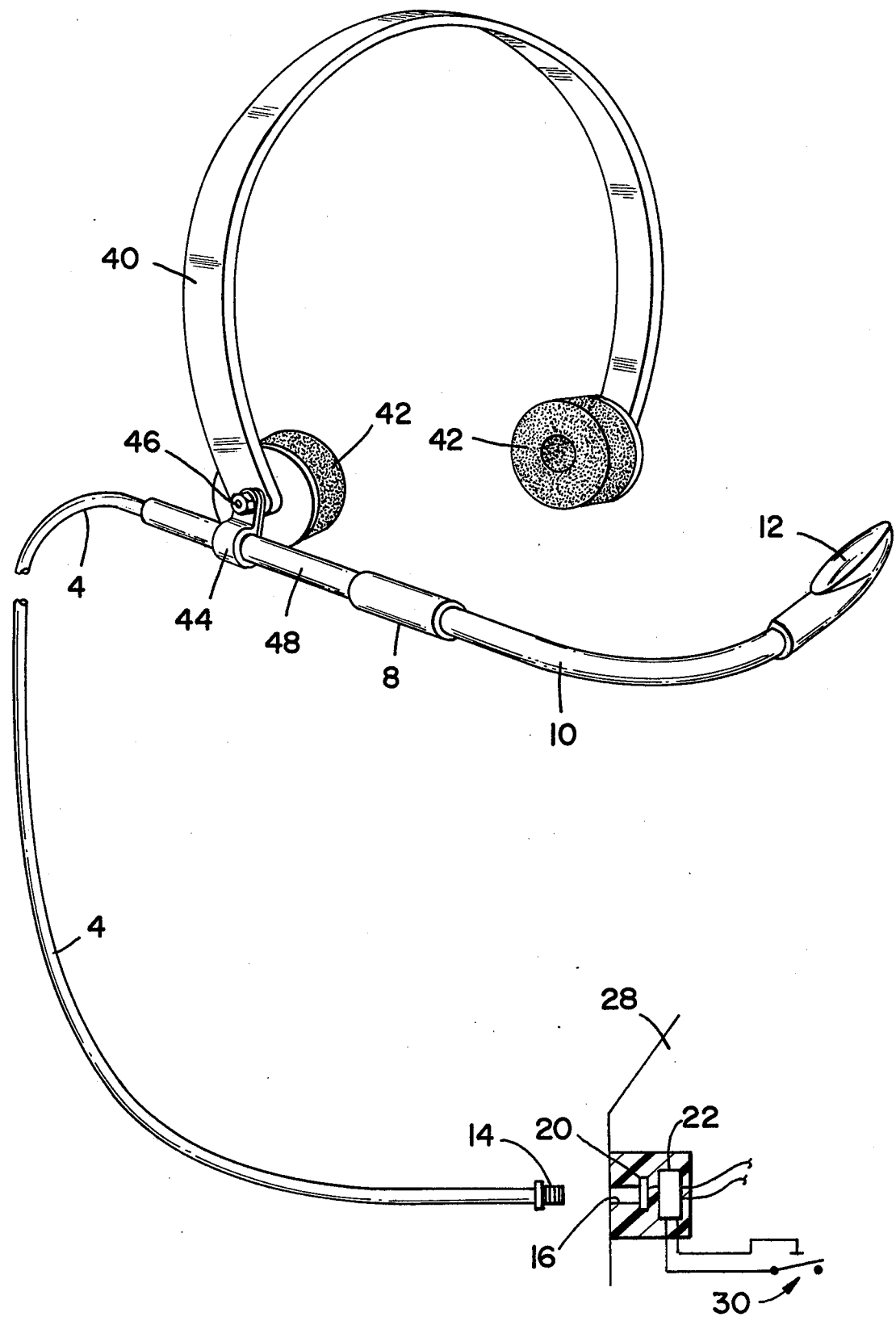

ACOUSTICAL VOICE TRANSMITTING HEADSET

RELATED APPLICATIONS

This application is a continuation-in-part of application Ser. Nos. 561,473, filed Mar. 24, 1975, now U.S. Pat. No. 3,993,879, dated Nov. 23, 1976 and 667,981 filed Mar. 18, 1976.

BACKGROUND OF THE INVENTION

In communication equipment, including public address systems, radio transmitters and transceivers, such as the highly popular citizen's band (CB) radios, the conventional voice transducer apparatus has been a handheld or stand mounted microphone. These types of transducers have presented several inconveniences and problems, including the necessity of holding the microphone or maintaining a fixed position while speaking into a stand mounted microphone. With mobile transceivers, such as vehicle mounted CB radios, the necessity for grasping the microphone and activating a push-to-talk switch has required the operator to remove one hand from the steering wheel of his vehicle, thus posing a potential safety problem in compromising the operator's ability to control his vehicle while speaking into the microphone. In emergency situations in which both immediate communications through the radio and also skillful maneuvering of the vehicle may be required simultaneously, this conventional microphone arrangement has been particularly disadvantageous.

One approach to alleviating the difficulties and disadvantages of the conventional stand mounted or handheld microphone has been through the use of electronic communication headsets, which typically incorporate a microphone and receiver which require an amplifier or other appropriate electronic impedance-matching circuits for interface with the communications equipment, or at least electrically conductive wires to similar electronic circuitry located in the equipment. These devices have been substantially miniaturized in recent years, one such device being described in U.S. Pat. No. 3,184,556 entitled "Miniature Headset-Microphone Adapted for Use with a Mask", issued May 18, 1965 to the inventor hereof. Another example is described in U.S. Pat. No. 3,781,492 which relates to miniaturized headsets. However, even as miniaturization has improved user comfort by reducing weight, initial cost is high. Owing to the relative fragility of their component parts, ruggedized construction is required, which also adds to the cost, and replacement or repair of these headsets is frequent and expensive. Stability and comfort have remained factors for improvement, as size and configuration of conventional headsets are determined by the dimensions of integrally mounted electronic components. In addition, the electrically conductive wires create a hazard to the user in that those wires can conduct high voltage transients, often present in and around communication systems, to the user's head.

It has been known to provide voice tubes attached to electrical sound transmitters to permit acoustic transmitting, and receiving, from electrical equipment nearby. Examples of such equipment are U.S. Pat. Nos. 1,541,121 and 1,615,974, but these devices are not head-mounted acoustical systems for detachable coupling to electronic communication equipment for regular use in replacing the microphone structure of miniaturized headsets. Suitable head-mounted structure which removes the electronic components from the headset is disclosed in my co-pending applications, listed above. However, that disclosed structure integrates both voice transmitting and receiving capabilities into a single unit, a combination which is not always required and which may be undesirable where voice transmission only is required. Such transmission-only requirement frequently arises in association with equipment such as the above-mentioned radio transceivers having speaker outputs for reception, public address equipment, tape recorders, and dictation equipment. As noted above, the conventional apparatus for voice transmission only to electronic communication equipment has comprised only a handheld structure such as a microphone or speaking tube, a mask mounted microphone, or a boom mounted microphone affixed to a structure adjacent the user. Each of these types of equipment has suffered from one or more of the disadvantages of requiring hand grasping during use, the placing of electronic apparatus and cables immediately adjacent the user's head and the manipulation and exposure of fragile and expensive electronic apparatus during use. These disadvantages have been particularly acute with mobile communication equipment such as vehicle mounted CB radios in which control of the vehicle may require use of both of the operator's hands and in which the environment may subject a conventional microphone to abuse and damage.

SUMMARY OF THE INVENTION

The present invention relates to an all-acoustic voice transmit-only headset which completely removes all electrical components from the head of the user. It comprises a transmitter tube having one end supported by attachment to the head of the user and adjustably positionable near the mouth of the user and the other end terminating in a coupling adapted to releasably connect to electronic communications equipment remote from the user's head. The means for supporting the tube can be supported on the user's ear, preferably behind the ear, as in conventional miniaturized headsets, or it can be mounted on a headband. The transmitter tube includes at one end a mouthpiece which may be an integral part of the transmitter tube or may be coupled to it. The other end of the transmitter tube includes a coupling for attachment to electronic communications equipment. This electronic communications equipment may be a radio transmitter or transceiver or a tape recorder or other equipment having the appropriate microphone transducer and transmitting electronics for coupling to the transmitting tube. In the preferred embodiment the headset attaches to a plug assembly having a microphone transducer and preamplifier contained within and which may in turn be plugged into the microphone input jack of the communications equipment, with the acoustic transmitter tube being detachably connected to the plug assembly. This permits use and repair of the headset and the microphone plug separately from the communications equipment.

The all-acoustic headset of this invention is entirely passive and includes no electronic components. It is, therefore, inherently insensitive to harsh use and shock. Moreover, if the headset is damaged or lost, it may be replaced at low cost. The safety of the acoustic headset is substantially improved because there is no possibility of shock or other harm resulting from the proximity of electrical wires and components to the head of the user, as in existing headsets and microphones. It is also lighter than any prior voice transmitting headset. Thus the unit provides for mobility and hands-free transmission to the communications equipment. Various types of microphone activating switches may also be incorporated for selectively operating the microphone during the desired transmission. In the preferred embodiment in which the operating switch is attached to and the microphone components are incorporated into a plug which is receivable into a standard microphone input socket, the apparatus of this invention has the additional feature of being interchangeable with the hand-held microphone conventionally used with such electronic communication equipment. By the use of this headset and a suitable steering wheel mounted or foot operated or knee operated push-to-talk switch, or a voice actuated switch, the apparatus of this invention provides a major improvement is safety over the conventional handheld microphone which it replaces. Through the use of the apparatus of this invention, both of the operator's hands are freed for controlling the vehicle at all times, even during voice trasmission by the operator over his communication equipment.

BRIEF DESCRIPTION OF THE DRAWINGS

FIG. 1 illustrates, partially in section, a headset according to one preferred embodiment of the present invention; and FIG. 2 illustrates a second embodiment of the headset of this invention.

DESCRIPTION OF PREFERRED EMBODIMENTS

In FIG. 1 is illustrated one preferred embodiment of the present invention which generally comprises a hollow post-auricle mount 2 into the lower end of which is inserted transmitter tube 4, which is coupled to the mount 2 by compression fit between elements 6 and 6' or other suitable means. At the end of mount 2 opposite the entry of transmitter tube 4 is a hollow adjustment means 8 which may suitably be constructed of any essentially inflexible material such as hard plastic or aluminum, and which is compressively received onto mount 2. Into the opposite end of adjustment means 8 is inserted mouthpiece tube 10, which at its opposite end includes mouthpiece 12, effectively forming an extension of transmitter tube. 4. The transmitter tube 4 is formed of a suitable flexible material, such as polyvinylchloride (PVC) tubing, but may be of any other acoustically similar material. Preferably, transmitter tube 4 is of approximately ¼ inches outside diameter and ⅛ inches inside diameter, although it may be of greater or lesser dimensions down to a minimum of about 50 mils inside diameter for suitable acoustic transmission. Mouthpiece 12 may also be formed of PVC, and mouthpiece tube 10 may be of any substantially rigid material such as aluminum tubing or a rigid plastic.

The end of transmitter tube 4 opposite the mounting means 2 terminates in a coupling plug 14, suitably of PVC, and which is snugly but removably receivable into a socket 16. The socket 16 suitably is formed in the outer end of a microphone coupling or plug assembly 17 which comprises a housing 18 incorporating a microphone transducer 20 and preamplifier 22 within the housing and having a standard microphone plug 24 extending outwardly therefrom. The plug 24, and thus the coupling or plug assembly, is removably receivable into a standard microphone jack 26 which is a part of any common electronics communication equipment 28. This equipment 28 may suitably be a radio transmitter or transceiver, dictation or recording equipment, public address equipment, or the like. Preferably, an intermittent press-to-talk switch 30 is attached to the plug or coupling assembly 17 to provide for selective, intermittent use of this transmission headset. The press-to-talk switch 30 may suitably be hand-, foot-, or knee-operated.

By this coupling arrangement, it may be seen that the transmitter tube 14 may be detachably connected to the plug assembly 17 and that the plug assembly 17 may be detachably coupled to the electronic communications equipment 28.

Post-auricle mount 2 is configured to rest on the ear of a user, extending around behind the ear. By virtue of the adjustment means 8 the rigid mouthpiece tube 10 may be adjusted to place the mouthpiece 12 near the mouth of a user. Thus, the acoustical waves of the voice of the user may be transmitted through mouthpiece 12, mouthpiece tube 10, adjustment means 8, post-auricle mounting means 2, transmission tube 4, and plug 14 to the microphone 20 and the plug assembly 17. Since the microphone 20, preamplifier 22 and press-to-talk switch 30 are incorporated into or attached to the plug assembly 17, the combination of the headset and the plug assembly may be substituted directly for a hand-held microphone conventionally used with communications equipment.

In FIG. 2 an alternative embodiment of the headset of this invention is illustrated in which the headset is mounted by means of a headband 40. At each end of the curved and generally C-shaped headband 40 is attached a pad 42 of polyurethane foam or other soft material to rest against the temples of the user. The headband 40 is constructed of plastic or other suitable material and is dimensioned and configured to provide a light spring tension at the ends of the headband against the temples of the wearer's head.

At one end of the headband 40 is attached a clamp 44, suitably by fastener 46. This clamp 44 engages a substantially rigid tube which is connected to one end to transmitter tube 4 and at the other end, through adjustment means 8, to mouthpiece tube 10. At the outermost end of mouthpiece tube 10 is attached flexible mouthpiece 12. As with the previous embodiment a plug 14 is attached at the free end of transmitter tube 4.

In this embodiment the transmitter tube receiving socket 16, microphone transducer 20, preamplifier 22, and switch 30 are illustrated as being mounted as an integral part of the electronic communications equipment 28 with which the headset is used, preferably being mounted internally thereof. The transmitter tube plug 14 may be inserted directly into the socket 16, which suitably is formed on the exterior of the communications equipment 28. Thus, in this embodiment, no fragile and expensive electronic microphone components whatsoever are placed externally of the communications equipment.

From the foregoing it may be seen that the acoustical, voice transmit-only headset of this invention enables all electronic components associated with voice transmission to be placed remote from the head and body of the user. The only components contacted by the user are of a simple, rugged, lightweight, and inexpensive nature. While two particularly preferred embodiments of the headset of this invention have been described above in detail, they are to be considered only as indicative of the principles of the invention and not limitative thereof, the scope of the invention being limited solely by the claims appended hereto.

What is claimed is:

1. A non-electrical, acoustical, voice transmit-only headset comprising
    means for mounting the headset on the head of the user;
    a flexible transmitter tube supported by the mounting means and having one end adapted for adjustably positioning near the mouth of the user for conducting sound therefrom, and the other end terminating in a coupling adapted to releasably connect to electronic communications equipment remote from the user's head, whereby voice transmissions may be conducted from the user to the communications equipment.

2. A headset according to claim 1 further comprising coupling means for coupling a microphone to said transmitter tube and for detachably coupling said transmitter tube through said microphone to said communications transmitter.

3. A headset according to claim 1 wherein said coupling means also includes a microphone and electronic circuit means to connect said microphone to said communications equipment.

4. A headset according to claim 3 wherein said coupling comprises a plug receivable into the microphone input socket of said communications equipment.

5. A headset according to claim 3 further comprising switch means for selectively connecting said microphone to said communications equipment.

6. A headset according to claim 5 wherein said switch means comprises a foot-operated switch.

7. A headset according to claim 5 wherein said switch means comprises a knee-operated switch.

8. A headset according to claim 5 wherein said switch comprises a hand-operated switch.

9. A headset according to claim 1 wherein said mounting means is a post-auricle mount.

10. A headset according to claim 1 wherein said mounting means comprises a headband.

11. A non-electrical, acoustical, voice transmit-only communications headset comprising
    mounting means for supporting the headset on the head of a user,
    a substantially rigid mouthpiece tube supported by said mounting means,
    adjustment means for locating one end of said mouthpiece tube near the mouth of the user, and
    a transmitter tube cooperating with said mouthpiece tube and adapted to releasably engage electronic communications equipment remote from the head of the user for acoustic transmission of voice communications from said mouthpiece tube to said communications equipment.

12. A headset according to claim 11 wherein said mounting means is a post-auricle mount.

* * * * *